Dec. 25, 1923.
C. BARCHUS
1,478,724
PISTON RING HOLDER
Filed Dec. 31, 1921
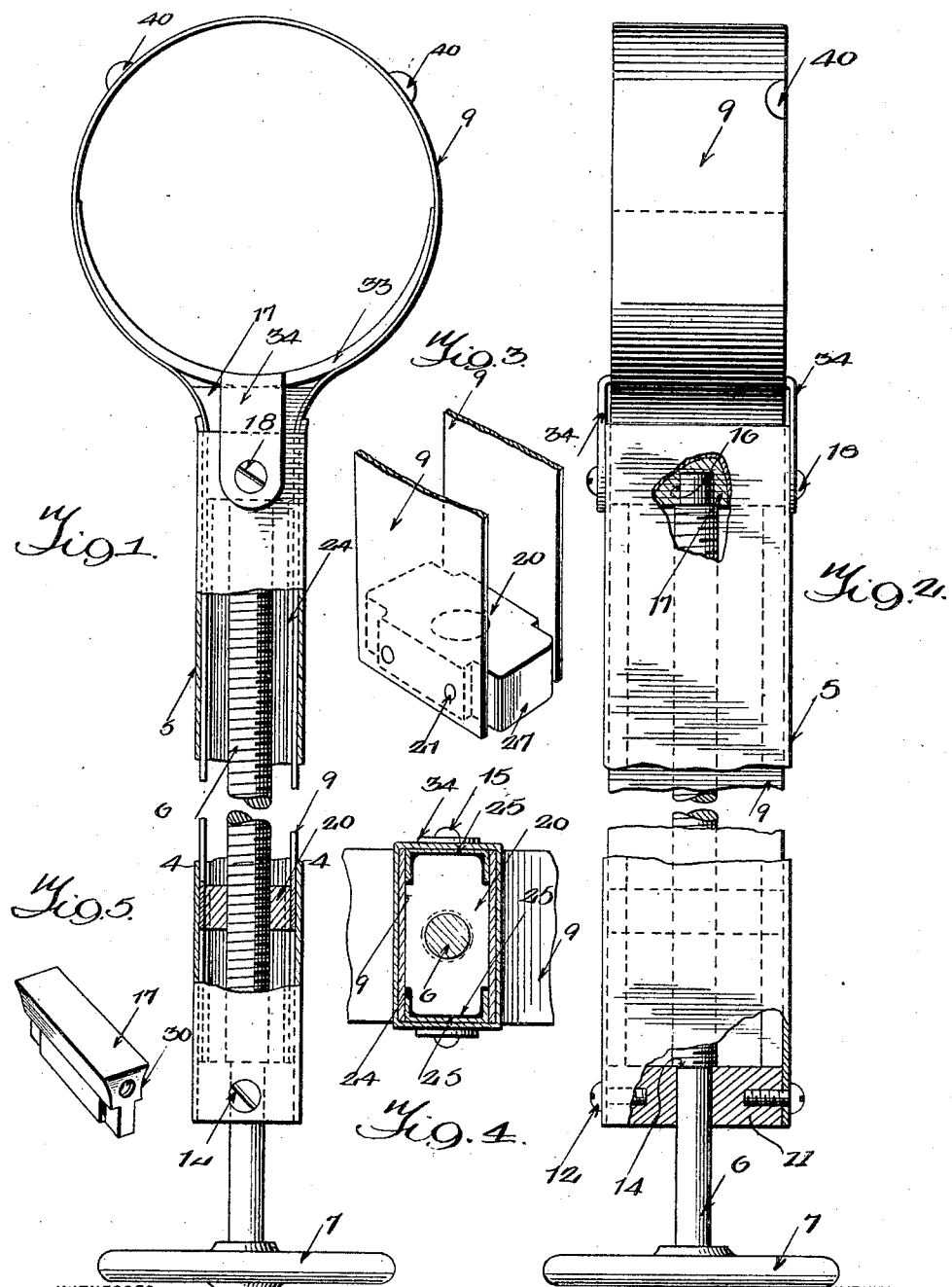
INVENTOR
C. BARCHUS,
ATTORNEYS.

Patented Dec. 25, 1923.

1,478,724

UNITED STATES PATENT OFFICE.

CHARLES BARCHUS, OF NATCHEZ, MISSISSIPPI.

PISTON-RING HOLDER.

Application filed December 31, 1921. Serial No. 526,303.

*To all whom it may concern:*

Be it known that I, CHARLES BARCHUS, a citizen of the United States, and resident of Natchez, in the county of Adams and State of Mississippi, have invented certain new and useful Improvements in Piston-Ring Holders, of which the following is a specification.

This invention relates to piston ring contracting devices especially adapted for use when inserting pistons into cylinders.

An important object of this invention is to provide a ring attaching device embodying a band adapted to be arranged about a piston so that the piston may be readily inserted into the cylinder without interference by the piston rings.

Further the invention forming the subject matter of this application aims to provide a piston ring contracting device having novel means whereby the same may be rapidly adjusted for use in connection with pistons of various sizes.

A further object is to provide a piston ring contracting device which is simple to operate, of highly simplified construction and cheap to manufacture.

Other objects and advantages of the invention will be apparent during the course of the following description.

In the accompanying drawing forming a part of this application and in which like numerals are employed to designate like parts throughout the same, Figure 1 is a plan view of the device, parts being shown in section.

Figure 2 is a fragmentary side elevation of the same.

Figure 3 is a fragmentary perspective of a piston engaging band and the nut connected to the ends of the band.

Figure 4 is a horizontal sectional view taken on line 4—4 of Figure 1.

Figure 5 is a perspective of a spacing block embodied in the invention.

In the drawing wherein for the purpose of illustration is shown a preferred embodiment of the invention the numeral 5 designates a tubular casing which as illustrated in Figure 4 is rectangular in cross section and receives a feed screw 6, the said feed screw being provided with a hand wheel 7 forming a means whereby the screw may be rotated for operating a ring contracting band 9. The feed screw 6 is held against longitudinal movement with relation to the casing by means of a stop element 11 secured within the rear portion of the casing by means of screw bolts 12 or the like. The rear portion of the screw is somewhat reduced to form an annular shoulder 14 which contacts with the forward side of the stop element 11. The forward portion of the feed nut is formed with a reduced member received within a socket 16 in a spacing head 17. The spacing element or head 17 is received within the forward portion of the casing and is detachably held in position by means of screw bolts 18. It is thus seen that the spacing head 17 forms a means to limit the forward movement of the feed screw while the stop element or head 11 limits the rearward movement of the feed screw.

As illustrated in Figure 3 the ends of the band 9 are connected to a feed nut 20 by fastening devices 21. The feed nut 20 is in turn threaded on the feed screw 6 so that when the feed screw is rotated the nut will be advanced or retracted. The band 9 is of a highly flexible flat spring metal and is held flatly in engagement with the sides of the casing by means of guide flanges 24 formed by bending the longitudinal edge portions of guide plates 25 inwardly. With reference to Figure 4 it will be seen that the guide flanges 24 are arranged in spaced relation to the sides of the casing and contact with the edges of the bands 9 so as to prevent the bands from buckling when moved forwardly for expanding the loops. The end portions of the feed nut 20 are reduced as indicated at 27 and flatly contact with the opposed sides of the flanges 24 whereby the feed nut is held against rotation.

As illustrated in Figure 1 the major portion of the band is extended beyond the casing to form a loop adapted for encircling a piston ring and the adjacent portion of the piston and when the feed nut 20 is drawn rearwardly the loops thus formed will be contracted for contracting the piston ring, whereby the same may be freely inserted into the cylinder. The sides of the spacing head 17 are curved transversely as indicated at 30 so as to direct the sides of the band 9 outwardly into circular formation.

The extended portion of the band 9 is maintained in looped formation by means of a somewhat stout though sufficiently flexible arcuate spring 33 having its intermediate portion provided with attaching ears 34 secured to the casing by means of the screw bolts 18. The arcuate spring 33 flatly contacts with the inner side of the ring attaching loop and thereby holds the extended portion of the band in the form of the loop. The arcuate spring 33 is sufficiently yieldable to permit the extensible loop to be varied in size.

In operation the extended portion of the band 9 is extended about the piston ring at the adjacent portion of the piston and the nut is thus contracted so as to hold the band or loop in place. The piston is now inserted into the cylinder and as the rings are contracted the rings will not interfere with the movement of the piston into the cylinder. The loop is of a thin metal and I therefore provide the same with oppositely arranged knobs 40 which contact with the lower end of the cylinder so as to prevent the band from sliding into the cylinder and thereby occupying the space into which the piston should pass.

Having thus described the invention what I claim is:—

1. A ring attaching device comprising a casing, a feed member arranged therein, a flexible band having its ends secured to said feed member and having its intermediate portion extended beyond the casing to form a ring engaging loop, and an arcuate spring connected to said casing and received within said loop.

2. A ring attaching device comprising a casing, a feed nut arranged therein, a flexible band having its ends secured to said feed nut and having its intermediate portion extended beyond the casing to form a ring engaging loop, operating means for said nut, and an arcuate spring received within said loop and having ears connected to said casing.

3. A ring attaching device comprising a casing, a feed nut arranged therein, a band of spring metal having its ends secured to said nut, the sides of said band being in contact with the sides of said casing and being extended beyond the casing to form a ring engaging loop, an operating device for said nut, and an arcuate member connected to said casing and engaging that portion of the band exteriorly of the casing whereby to maintain the same in the form of a loop.

4. A ring attaching device comprising a casing, a feed nut arranged therein, a band of spring metal having its ends secured to said nut, the intermediate portion of said band being extended beyond the casing to form a ring engaging loop, an operating device for said feed nut, and an arcuate spring member received in said loop and connected to said casing.

5. A ring attaching device comprising a casing, a feed nut arranged therein, a band having its ends secured to said nut, the sides of said band being in contact with the sides of said casing and being extended beyond the casing to form a ring engaging loop, an operating device for said feed nut, an arcuate spring member received in said loop and connected to said casing, and a spacing device arranged at the forward end of said casing between the sides of said band.

6. A ring attaching device comprising a casing, a feed nut arranged therein, a band having its ends secured to said nut, the sides of said band being firmly in contact with the sides of said casing and being extended beyond the casing to form a ring engaging loop, an operating device for said feed nut, an arcuate spring member received in said loop and connected to said casing, a spacing device arranged at the forward end of said casing between the sides of said band, and guiding means for the sides of said band.

7. A ring attaching device comprising a casing, a feed nut arranged therein, a band of spring metal having its ends secured to said nut, the intermediate portion of the band being extended beyond the casing to form a ring engaging loop, an operating device for said feed nut, an arcuate member received in said loop and connected to said casing, a spacing device arranged at the forward end of said casing between the sides of said band, guiding means for the sides of said band, the operating device for said feed nut being in the nature of a feed screw terminating beyond the rear end of the casing and formed with a hand wheel.

8. A ring attaching device comprising a casing, a band extending into the casing, a feed device movable in said casing and having connection with said band, and means whereby to maintain that portion of the band exteriorly of the casing approximately in the form of a loop.

9. A ring attaching device comprising a casing, a band extending into the casing, a feed device movable in said casing and having connection with said band, and means whereby to maintain that portion of the band exteriorly of the casing approximately in the form of a loop, said means consisting of an arcuate body connected intermediate its ends to the casing.

CHARLES BARCHUS.